J. V. JENKINS.

Sheep Shears.

No. 2,614. Reissued May 14, 1867.

N. PETERS. Photo-Lithographer, Washington, D. C.

United States Patent Office.

RICHARD B. WALKER AND LEWIS MILLER, OF AKRON, OHIO, ASSIGNEES OF JOHN V. JENKINS.

*Letters Patent No.* 18,151, *dated September* 8, 1857; *reissue No.* 2,614, *dated May* 14, 1867.

SHEEP-SHEARING MACHINE.

The Schedule referred to in these Letters Patent and making part of the same.

TO ALL WHOM IT MAY CONCERN:

Be it known that I, JOHN V. JENKINS, formerly of Jackson, in the county of Jackson, and State of Michigan, now residing in Manchester, in the county of Washtenaw, and State aforesaid, have invented certain new and useful improvements in Sheep-Shearing Machines; and I do hereby declare the following to be a full, clear, and exact description of the same, reference being had to the accompanying drawings, making part of this specification, in which—

Similar letters of reference where they occur in the separate figures denote like parts in both of them.

Figures 1, 2:
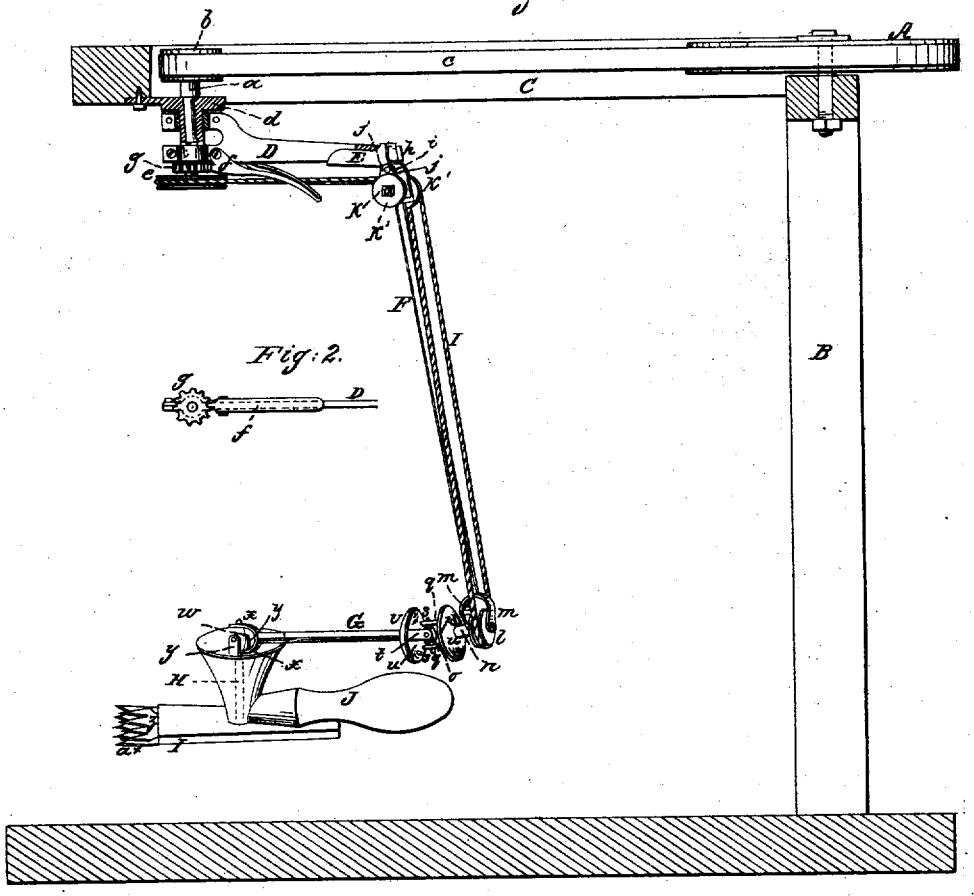
Figure 1 represents an elevation of my machine, the frame being shown partially in section.
Figure 2 represents a view of a detached portion of the same, not clearly seen in fig. 1.

My invention consists, first, in suspending the shears and flexible connection by which the power to drive them is communicated to them from an extended arm or beam, so as to leave an unobstructed space under said point of suspension, in and through which the shears may be moved without encumbrance as they are guided and directed over the body of the animal, and so that the animal may be moved or turned into convenient position by the operator. And my invention further consists is transmitting the power from the first mover to drive the shears or cutter through, or by means of one or more endless belts, and one or more shafts, and a series of universal joints, by which means greater range of motion can be given to the shears, and increased facilities to the operator in managing the shears, as well as the animal being sheared by them.

A represents a pulley or band-wheel, which may be driven by any ordinary well-known means or power. This pulley or band-wheel A is placed at or over the upper part of a vertical frame, B, and to this vertical frame is attached a horizontal frame or arm, C, extending some distance from its point of connection with B, and having at or near its outer end a shaft, *a*, suitably supported in bearings in which it may turn freely. Upon the shaft *a* there is a pulley, *b*, around which, and around the band-wheel or pulley A, passes an endless belt, *c*, by or through which motion is communicated to the shaft *a*, and through it to the shears, as will be hereafter described. By this first arrangement of frame and transmission of power, a large unobstrubted space is obtained, in and through which the operator may place, move, or hold the animal to be sheared, and guide, direct, and turn the shears with the greatest facility and convenience. The shaft *a* is fitted within a socket, tube, or sleeve, *d*, which is permanently attached to the frame or extended arm C, and a pulley, *e*, is attached to the lower end of the shaft. Upon the socket, tube, or sleeve *d*, a horizontal bar or arm, D, is fitted or hung, said bar being capable of being turned on said socket, tube, or sleeve, when necessary, and held thereto in any desired position by means of a spring-catch, *f*, which takes into a notched flange, *g*, at the lower end of the socket, tube, or sleeve, and as more distinctly seen in fig. 2. On the bar or arm D a slide, E, is fitted or placed, and to the outer end of this slide a rod or shaft, F, is attached by a joint, *h*. This joint may be formed by having the end of the rod or shaft F forked, and having a pin, *i*, attached to the end of the slide, the ends of the pin *i* fitting in the ends of the two prongs *j j* of the fork. A small rod or shaft, *k*, runs through the two prongs *j j*, and a pulley, *k'*, is placed on each end of it. The lower end of the rod or shaft F is forked, and a pulley, *l*, is fitted and supported between the two branches *m m* of said fork. The pulley *l* is placed on a small shaft, *n*, which passes through the branches *m m*, and has a concave or dish-shaped guard, *p*, at its end, which guard is furnished with branches *q q*, between which a disk or wrist, *r*, is placed, said disk having a pin, *s*, at opposite sides of its periphery, the pins fitting loosely on the ends of the branches. The disk *r* has also two pins, *t t*, on its periphery at opposite sides, the line of the pins *t* intersecting at right angles the line of the pins *s*. The ends of the pins *t* are fitted into the ends of branches *u u*, which are attached to a dish-shaped guard, *v*, which is similar to that, *p*, above described. The guard *v* is attached to a rod or shaft, G, which is forked at its other end, and has a disk, *w*, fitted between its branches *x x*, said disk being also fitted or connected between branches *y* attached to a cam-shaft, H, which drives or actuates the cutters *z*, which work over the stationary fingers *a*×, made on the end of plate I, which plate is attached to the handle J. The cutting devices may be made and actuated like those described in the patent heretofore obtained by me. The forks, with the disks fitted between them, form universal joints, and in connection with the joint *h* allow the cutting device to be moved in either or all directions, whilst the guards *p v* limit the movement of the rods F G as regards their relative positions with each other, so that motion may always be transmitted from the shaft F to the shaft G without endangering the universal joint which connects the two shafts. A driving-belt or cord, I, passes over and around the pulleys *e*, *k'*, and *l*, to transmit motion through and past the universal joints to the shaft G, which transmits it in turn to the driving-shaft and the cutters.

From the above description it will be seen that the cutting device may be moved in either direction, and that the bar D may be swung around on the shaft *a*, and secured at any desired point. The operator's position is under the shaft *a*, and by the arrangement of parts, as herein described, has perfect control over the cutting device whilst it is in operation, and free space to work in.

Having thus fully described my invention, what I claim, and desire to secure by Letters Patent, is—

Attaching or suspending the cutter and its connections to an extended or projecting arm, substantially as and for the purpose described.

I also claim transmitting the power to drive the shear-cutter through or by means of one or more endless belts, and one or more shafts, and one or more universal joints, whereby greater range of motion can be given to the cutter, and increased facilities to the operator in guiding them, and in managing the animal to be sheared, substantially as described.

JOHN V. JENKINS.

Witnesses:
JOHN W. RICE,
MARY B. RICE.